(12) United States Patent
Awan et al.

(10) Patent No.: US 12,013,783 B2
(45) Date of Patent: Jun. 18, 2024

(54) SNAPSHOTTING DATA OF A HOST APPLICATION

(71) Applicant: Telefonaktiebolaget LM Ericsson (publ), Stockholm (SE)

(72) Inventors: Ahsan Javed Awan, Vallentuna (SE); Amir Roozbeh, Stockholm (SE); Chakri Padala, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 3 days.

(21) Appl. No.: 17/905,335

(22) PCT Filed: Mar. 4, 2020

(86) PCT No.: PCT/SE2020/050240
§ 371 (c)(1),
(2) Date: Aug. 31, 2022

(87) PCT Pub. No.: WO2021/177868
PCT Pub. Date: Sep. 10, 2021

(65) Prior Publication Data
US 2023/0185716 A1  Jun. 15, 2023

(51) Int. Cl.
*G06F 12/08* (2016.01)
*G06F 12/0815* (2016.01)
(52) U.S. Cl.
CPC .. *G06F 12/0815* (2013.01); *G06F 2212/1032* (2013.01)
(58) Field of Classification Search
None
See application file for complete search history.

(56) References Cited

U.S. PATENT DOCUMENTS

| | | | | |
|---|---|---|---|---|
| 10,691,597 | B1* | 6/2020 | Akkary | H04L 67/60 |
| 2010/0262786 | A1* | 10/2010 | Cummings | G06F 12/0831 |
| | | | | 711/E12.052 |
| 2013/0262072 | A1* | 10/2013 | Asaad | G01R 31/2851 |
| | | | | 703/13 |
| 2020/0034175 | A1* | 1/2020 | Calciu | G06F 9/45558 |
| 2020/0034297 | A1* | 1/2020 | Calciu | G06F 12/0817 |
| 2020/0310650 | A1* | 10/2020 | Hadas | G06F 3/065 |
| 2022/0382638 | A1* | 12/2022 | Martin | G06F 12/1009 |

OTHER PUBLICATIONS

International Search Report and Written Opinion for Application No. PCT/SE2020/050240, dated Dec. 2, 2020, 12 pages.
"Accelerator Functional Unit Developer's Guide for Intel® FPGA Programmable Acceleration Card," Dec. 26, 2019, 44 pages, UG-20169, Intel Corporation.

* cited by examiner

*Primary Examiner* — Tracy C Chan
(74) *Attorney, Agent, or Firm* — Nicholson De Vos Webster & Elliott LLP (57) ABSTRACT

There is provided mechanisms for snapshotting data of a host application. A method is performed by a field-programmable gate array (FPGA). The method comprises snooping a cache coherent interconnect of a host computer on which the host application is running. The cache coherent interconnect is snooped for dirty cache lines, each dirty cache line having an address. The method comprises writing, only when the address of any of the dirty cache lines has a match in a snapshot address table, data of that dirty cache line to a non-volatile memory.

16 Claims, 5 Drawing Sheets

SNAPSHOTTING DATA OF A HOST APPLICATION

CROSS-REFERENCE TO RELATED APPLICATIONS

This application is a National stage of International Application No. PCT/SE2020/050240, filed Mar. 4, 2020, which is hereby incorporated by reference.

TECHNICAL FIELD

Embodiments presented herein relate to a method, a field-programmable gate array (FPGA), a computer program, and a computer program product for snapshotting data of a host application.

BACKGROUND

In some scenarios it is beneficial to save application states so that the application can be resumed when the host computer running the application has recovered from failure, e.g., power failure.

One mechanism for saving application state at failure time involves having a capacitor attached to the system or to a Dual In-line Memory Module (DIMM). The capacitor provides power back-up for the system. Upon detection of power failure, the system starts writing the content of the main memory to the DIMM. However, the system is typically not aware of the memory boundaries of the application. As a result, the system might not be capable of saving application specific states and instead end up saving the whole content of the memory.

The use of traditional persistent storage (hard drives, solid-state drives (SSDs), etc.) for taking the snapshot of the application incurs a penalty in terms of latency and throughput of the device on which the application is running and is limited by the granularity of the memory page sizes. This in turn effects the ability of the system to recover from power failures with minimum possible down-time.

Non-volatile memories (NVM) such as storage class memories (SCM) have characteristics that make these memories desirable for both DRAM and storage-centric applications. However, these memories have slightly higher latencies and slightly less endurance than a dynamic random access memory (DRAM).

The performance characteristics of current generation NVMs are still not comparable with that of DRAMs. It is therefore not feasible to replace current generation NVMs as replacement for DRAMs.

NVMs can potentially be used to store the application state persistently as a way to recover from power failure. This can be achieved by the application directly accessing the NVM (similar to how the application accesses the DRAM) and to store data.

However, this requires using new application programming interfaces (APIs) and an expensive rewrite of the application. Alternatively, the NVM can be used to create file systems, or be treated as a disk partition. However, this requires the data to pass through the operating system kernel before reaching the file systems or disk partition, which is highly inefficient.

Some applications tend to save their state periodically so that during a power loss or other interruption or corruption of data, the host computer is enabled to restore the application from this state without losing all performed computation. This saved state is referred to as a snapshot. Neither of the disclosed approaches where direct use of NVM is enabled are suitable for taking snapshots for highly intensive in-memory computing jobs upon an application running on the host computer.

Hence, there is still a need for improved handling of application states so that the application can be resumed when the host computer running the application has recovered from failure.

SUMMARY

An object of embodiments herein is to provide efficient snapshotting of data of a host application run on a host computer.

According to a first aspect there is presented a method for snapshotting data of a host application. The method is performed by an FPGA. The method comprises snooping a cache coherent interconnect of a host computer on which the host application is running. The cache coherent interconnect is snooped for dirty cache lines, each dirty cache line having an address. The method comprises writing, only when the address of any of the dirty cache lines has a match in a snapshot address table, data of that dirty cache line to a non-volatile memory.

According to a second aspect there is presented an FPGA for snapshotting data of a host application. The FPGA comprises processing circuitry. The processing circuitry is configured to cause the FPGA to snoop a cache coherent interconnect of a host computer on which the host application is running. The cache coherent interconnect is snooped for dirty cache lines, each dirty cache line having an address. The processing circuitry is configured to cause the FPGA write, only when the address of any of the dirty cache lines has a match in a snapshot address table, data of that dirty cache line to a non-volatile memory.

According to a third aspect there is presented an FPGA for snapshotting data of a host application. The FPGA comprises a snoop module configured to snoop a cache coherent interconnect of a host computer on which the host application is running. The cache coherent interconnect is snooped for dirty cache lines, each dirty cache line having an address. The FPGA comprises a write module configured to snoop write, only when the address of any of the dirty cache lines has a match in a snapshot address table, data of that dirty cache line to a non-volatile memory.

According to a fourth aspect there is presented a computer program for snapshotting data of a host application, the computer program comprising computer program code which, when run on processing circuitry of an FPGA, causes the FPGA to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage.

Advantageously these aspects provide efficient snapshotting of data of the host application as run on the host computer.

Advantageously these aspects enable the host application to be correctly resumed when the host computer running the host application has recovered from failure, such as power failure or operative system crash, or has performed a reboot.

Advantageously, by means of snooping the cache coherent interconnect, the granularity of data updates from the volatile memory into the non-volatile memory can be at the level of a single cache lines (typically 64 bytes) instead of a memory page (typically 4 kilobytes).

Advantageously these aspects enable the content of the volatile memory to be actively backed up.

Advantageously these aspects enable the use of a smaller capacitor than existing schemes.

Advantageously these aspects allow the host application to specify checkpoints, providing benefits over current capacitor-based schemes.

Advantageously these aspects require minimal intervention in the host application.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As noted above there is still a need for improved handling of application states so that the host application 340 can be resumed (in its correct application state) when the host computer 300 running the host application 340 has recovered from power failure, or operative system crash, or has performed a reboot.

Figure 1:
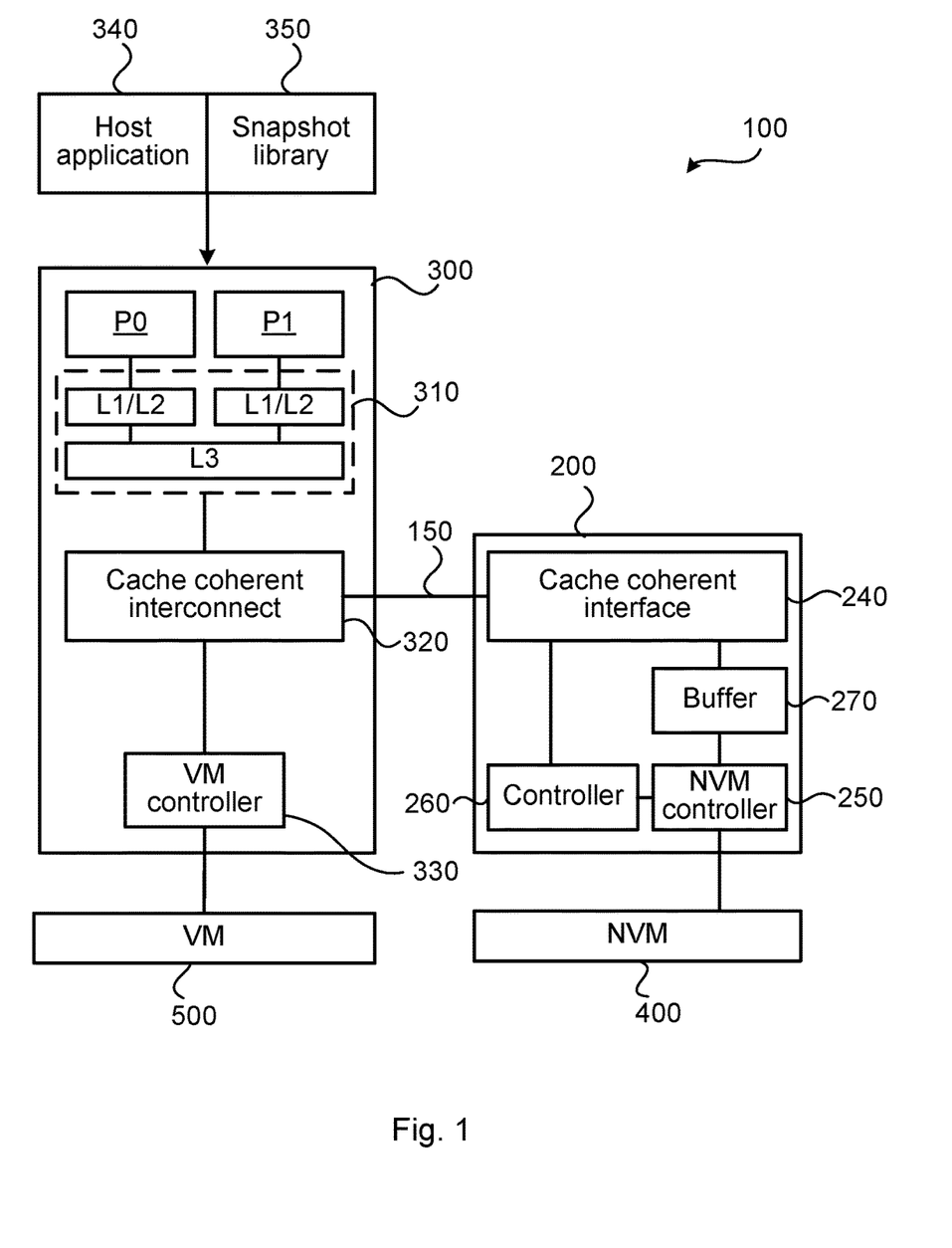
FIG. 1 is a schematic diagram illustrating a system according to embodiments.

FIG. 1 is a schematic diagram illustrating a system 100 where embodiments presented herein can be applied. The system 100 comprises a host computer 300 and an FPGA 200. The host computer 300 comprises a cache 310 with cache levels L1, L2, L3 for caching data of a host application 340 run on the host computer 300 on processing cores P0 and P1. The host computer 300 further comprises a volatile memory (VM) controller 330 for controlling read and write operations of a VM 500 connected to the host computer 300. The VM 500 might be a DRAM. A cache coherent interconnect 320 is provided between the cache 310 and the volatile memory controller 330, thus giving access to cache lines. As will be further disclosed below, a snapshot library 350 provides a checkpoint function of the application state.

The FPGA 200 comprises a general controller 260 for controlling the operation of the FPGA 200 and a non-volatile memory controller 250 for controlling read and write operations of an NVM 400 connected to the FPGA 200. The FPGA 200 further comprises a cache coherent interface 240 that can be used by the FPGA 200 to snoop the cache coherent interconnect 320 of the host computer 300. The cache coherent interface 240 might implement an NVM Express (NVMe) controller such as Coherent Accelerator Processor Interface Flash (CAPI Flash). Snooped data, or the address to the snooped data might be intermittently stored in a buffer 270. The controller 260 is operatively connected to the cache coherent interconnect 320 via the cache coherent interface 240.

The host computer 300 and the FPGA 200 are configured to communicate with each other over an interface 150, such as a Peripheral Component Interconnect Express (PCIe) interface, an ultra path interconnect (UPI) interface, or a compute express link (CXL) interface. In particular, the cache coherent interface 240 of the FPGA 200 is operatively connected to the cache coherent interconnect 320 of the host computer 300. The FPGA 200 is thus configured to snoop the cache coherent interconnect 320.

The embodiments disclosed herein in particular relate to mechanisms for snapshotting data of a host application 340. In order to obtain such mechanisms there is provided an FPGA 200, a method performed by the FPGA 200, a computer program product comprising code, for example in the form of a computer program, that when run on an FPGA 200, causes the FPGA 200 to perform the method.

Figure 2:
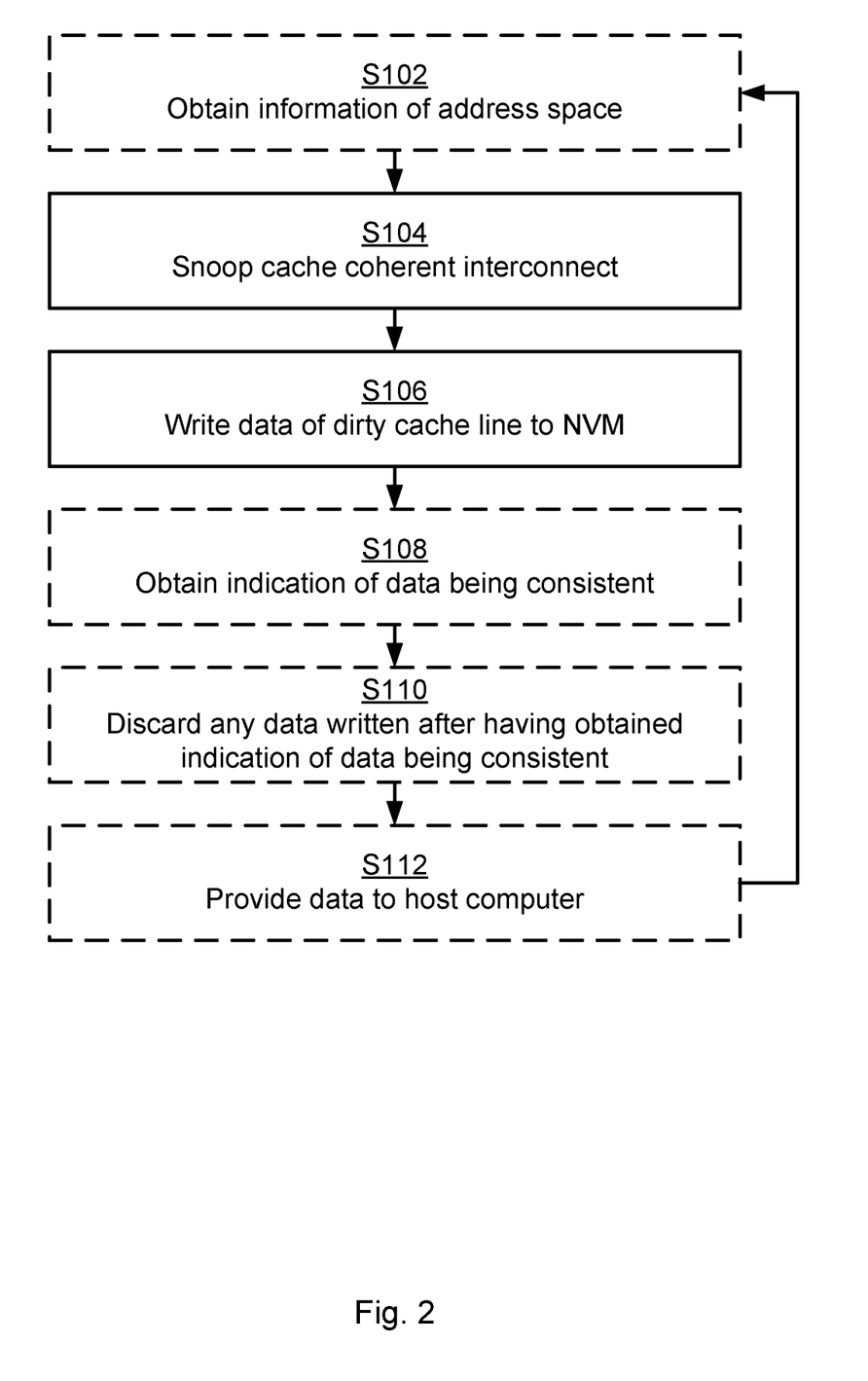
FIGS. 2 and 4 are flowcharts of methods according to embodiments.

FIG. 2 is a flowchart illustrating embodiments of methods for snapshotting data of a host application 340. The methods are performed by the FPGA 200. In some aspects, at least some of the steps are performed by the controller 260 of the FPGA 200. The controller 260 might thus be configured to act as an agent for enabling the NVM 400 to be used for storing snapshots of the VM 500. The methods are advantageously provided as computer programs 720.

The FPGA 200 snoops the cache coherent interconnect 320 (via interface 150 between the cache coherent interface 240 of the FPGA 200 and the cache coherent interconnect 320 of the host computer 300) and writes data to the NVM 400 only if the address of any dirty cache line has a match in a snapshot address table. In particular, the FPGA 200 is configured to perform steps S104, S106:

S104: The FPGA 200 snoops the cache coherent interconnect 320 of the host computer 300 on which the host application 340 is running. The cache coherent interconnect 320 is snooped for dirty cache lines. Each dirty cache line has an address.

S106: The FPGA 200 writes, only when the address of any of the dirty cache lines has a match in a snapshot address table, the data of that dirty cache line to the NVM 400.

This results in the data of the host application 340 being snapshotted.

Embodiments relating to further details of snapshotting data of a host application 340 as performed by the FPGA 200 will now be disclosed.

As noted above, in some aspects, the snooping is performed via the cache coherent interface 240. That is, in some embodiments, the cache coherent interconnect 320 is snooped via the cache coherent interface 240 of the FPGA 200, and the cache coherent interface 240 is operatively connected to the cache coherent interconnect 320. The cache coherent interface 240 is operatively connected to the cache coherent interconnect 320 via interface 150.

There could be different ways for the FPGA 200 to obtain the snapshot address table. In some aspects, the FPGA 200 explicitly receives information of the address space. Hence, in some embodiments the FPGA 200 is configures to perform (optional) step S102:

S102: The FPGA 200 obtains information of which address space in a VM 500 of the host computer 300 is allocated for storing data of the host application 340.

The entries of the snapshot address table might then be defined by this address space. Further, the address space might in turn be defined by page table entries.

In some aspects, the same size of the address space as allocated in the VM 500 is allocated in the NVM 400. That is, in some embodiments, an as large address space as the address space allocated in the VM 500 is allocated in the NVM 400 for storing the data of the dirty cache lines.

There could be different entities from which the address space information in S102 is obtained. In some embodiments this information is obtained from a snapshot library 350 of the host computer 300.

Upon having obtained the information in step S102, the FPGA might store the information for future use. In some examples this information is stored in the NVM 400. Further, a copy of this information might be stored in a local static random access memory (SRAM) in the FPGA 200.

There could be different ways for the FPGA 200 to write the data to the NVM 400. In some embodiments, the data is written to the NVM 400 via a buffer 270 in the FPGA 200. Different aspects of how the data might be written to the NVM 400 via the buffer 270 in the FPGA 200 will now be disclosed.

In some aspects, the data itself is written to the buffer 270. That is, in some embodiments, the data is written to the buffer 270 before being written to the NVM 400. This is hereinafter referred to as write through mode.

In other aspects, the data itself is not written to the buffer 270. In particular, in some embodiments, only the address of the dirty cache line, but not the data itself, is written to the buffer 270. The controller 260 might then stream the data from the addresses stored in the buffer 270 and write the data to the NVM 400. This is hereinafter referred to as index mode.

There could be different criteria for determining whether the FPGA 200 is to use the write through mode or the index mode when writing the data to the NVM 400 via the buffer 270 in the FPGA 200. In some aspects, whether to use the write through mode or the index mode depends on the frequency of occurrence of the data and/or on the size of the buffer 270. In particular, according to an embodiment, whether the data is written to the buffer 270 before being written to the NVM 400 (as in the write through mode) or only the address of the dirty cache line, but not the data itself, is written to the buffer 270 (as in the index mode) depends on the size of the buffer 270 and/or how often data of the dirty cache lines is snooped. For example, the index mode might be used for comparatively high volumes of data to be written whereas the write through mode might be used for comparatively low volumes of data to be written. For example, the index mode might be used when there is a need to write data comparatively often whereas the write through mode might be used when there only is a need to write data comparatively seldom. In further aspects, whether to use the write through mode or the index mode further depends on the size of the buffer 270. For example, the index mode might be used when the buffer 270 is comparatively small whereas the write through mode might be used the buffer 270 is comparatively large.

In some aspects, a checkpoint function is provided to enable the FPGA 200 to flush data that is no longer useful for the host computer 300 or the host application 340 run on the host computer 300. This might require the FPGA 200 to possess information of data consistency between the NVM 400 and the VM 500. Thus, according to some embodiments, the FPGA 200 is configured to perform (optional) step S108:

S108: The FPGA 200 obtains an indicator of data as stored in the NVM 400 being consistent with data stored in the VM 500.

Data that is not consistent might then be flushed from the NVM 400. Thus, according to some embodiments, the FPGA 200 is configured to perform (optional) step S110:

S110: The FPGA 200 discards any data having been written to the NVM 400 after the indicator was obtained in case power of the host computer 300 is lost.

Further, data written to, and stored in, the NVM 400 might be provided back to the host computer 300. This could be the case where the host computer 300 has recovered from power failure. Thus, according to some embodiments, the FPGA 200 is configured to perform (optional) step S112:

S112: The FPGA 200 provides data as stored in the NVM 400 to the host computer 300 upon receiving an indication that the host application 340 has recovered its operation after the host computer 300 has recovered from power failure.

In summary, as the host application 340 allocates and deletes memory in the VM 500, these updates are sent to the FPGA 200 as a new active address space. The FPGA 200 in turn monitors the new active address space for cache line snooping.

When an address within the new active address space is modified, the host computer 300 announces the modifications through the cache coherency protocol. The FPGA 200 receives the modifications and might store the modified addresses and/or the data content in a buffer 270. This buffer 270 might be provided to account for any speed difference between the VM 500 and the NVM 400. The data of this buffer 270, or the data that the address in the buffer 270 points at, will then be written to the NVM 400. An optimization scheme might be used that matches the remaining amount of buffer space with the incoming update speed. Upon a power failure, only the buffer 270 needs to be flushed to the NVM 400.

Figure 3:
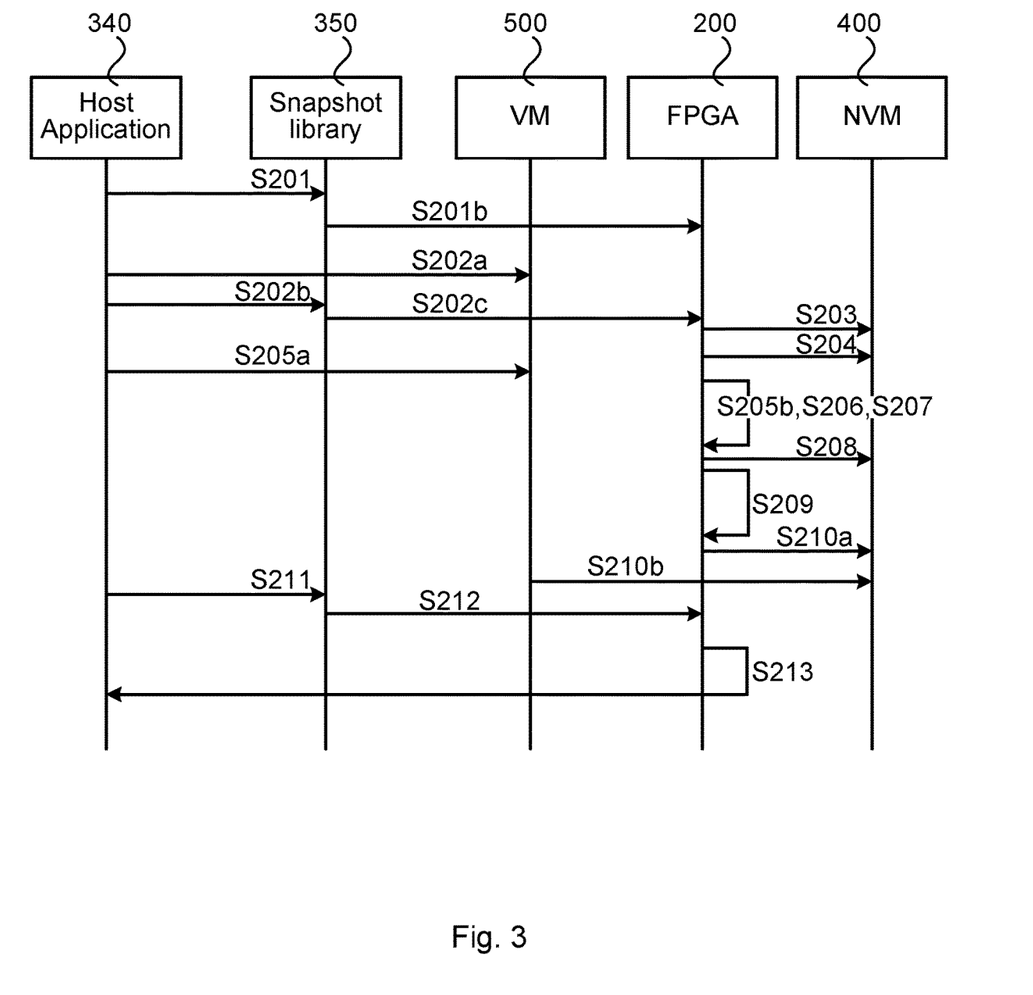
FIG. 3 is a signalling diagram of a method according to an embodiment.
Figure 4:
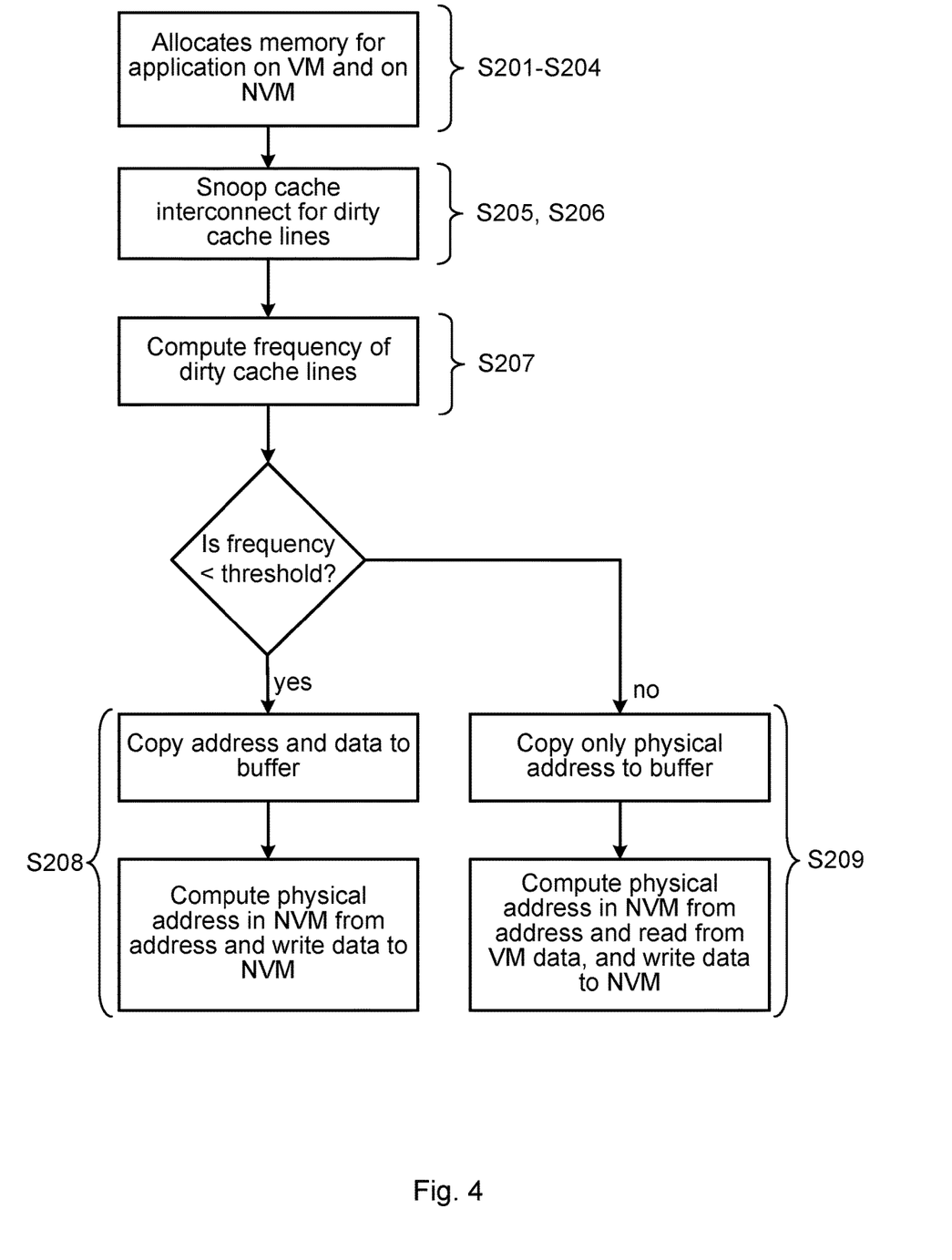

One particular embodiment for snapshotting data of a host application 340 based on at least some of the above embodiments will now be disclosed with parallel references to the signalling diagram of FIG. 3 and the flowchart of FIG. 4.

The host application 340 initializes the snapshot library 350 with a name of the snapshot, intensity of writes, whether checkpointing is to be used and approximate size of memory that will be snapshotted (S201). A single process can create multiple different snapshots allowing host applications 340 to share their snapshots. The snapshot library 350 validates that the name is unique to ensure during recovery of the host computer that the name represents the same application.

Disks have partitions, sectors, cylinders etc. that act as addresses for storing data. In case of NVMs 400, namespace represent a similar addressable entity. The snapshot library 350 therefore keeps a mapping of snapshot name to the NVM namespace where it is stored and the FPGA 200 (if multiple FPGAs exist on the server) through which the NVM 400 is attached (S201b). When the host application 340 or the host computer 300 is restarted, this information is necessary to restart/recover the snapshotting process. This mapping is stored in a reliable fashion in a local file system or an external key-value storage, etc.

As the host application 340 allocates memory of interest (S202a), every memory allocation that needs to be snapshotted is communicated to the snapshot library 350 (S202b). The snapshot library 350 communicates the relevant page table entries and the size of allocated memory to the FPGA 200 (S202c). This information enables the FPGA 200 to snoop the relevant portions of the memory.

The FPGA 200 stores the information in a table, denoted "ss_addr_table", maintained inside the FPGA 200. This table is persisted in NVM 400 and a copy of it is kept in the local SRAM of the FPGA 200 (S203). At a restart of the host application 340 or the host computer 300, this table is initialized with new addresses for snooping.

The FPGA 200 allocates the same size of memory chunk on the NVM 400 and copies the physical address of the starting location of the allocated memory in the table ss_addr_table (S204). The FPGA 200 and the host application 340 participates in cache coherence via the cache coherent interface 240 and the cache coherent interconnect 320.

As the host application 340 writes data to the volatile memory 500 (S205a), the FPGA 200 snoops the interconnect for the dirty cache lines (S205b). The FPGA 200 looks up the address of the dirty cache lines in the snapshot table. If a match is detected, the memory update is of interest. The FPGA 200 has a buffer 270 to compensate for the reduced bandwidth (in terms of read/write speed) of the NVM 400 as compared to the bandwidth of the VM 500. A register is maintained by the FPGA 200 to indicate the space available on the buffer 270 (S206).

Based on buffer capacity, the frequency of incoming writes, etc., either a write through or index mode is selected (S207). If the write through mode is selected, the data of the dirty cache lines is written to the buffer 270. The NVM controller 250 reads from the buffer 270 and writes to the NVM 400 (S208). If the index mode is selected, only the physical address of the dirty cache lines is written to the buffer 270 (S209).

A background function keeps flushing buffers to the FPGA 200 (S210a). For the addresses that are stored when the index mode is used, the FPGA 200 reads the actual data from the VM 500, using the physical address stored in the buffer 270 and writes the data to the NVM (S210b).

The snapshot library 350 provides a checkpoint function. Checkpointing as herein used refers to the ability of the host application 340 to inform that the data is consistent up to a given point in time. Any data written after a checkpoint has been issued can be discarded when subsequently power is lost and no further checkpoints have been issued. The host application 340, after flushing the relevant data, calls checkpoint function in the snapshot library 350 (S211). The checkpoint function 350 blocks the host application 340 and invokes the FPGA 200 through the write to a special register (S212). The FPGA 200 in response flushes all the buffers 270, fetches all indexed addresses, deletes the undo log, and returns the data to the application (S213).

A system level snapshot manager could be configured to handle the location of currently available snapshots, the NVMs 400, or namespaces, where they are located and the FPGAs 200 to which these NVMs 400 are attached. In a disaggregated memory architecture, it is possible that an NVM 400 from pool of NVMs is attached to the FPGA 200 over a fast interconnect. The system level snapshot manager can enable a logical name to be disassociated from one host computer 300 and launched on another host computer. A host application 340 can thus be launched on the new host computer 300 which can recover data of the host application 340 into its own VM 500 from the NVM 400 via the FPGA 200 and start running the host application 340 without any implications for run time performance. This provides a way to migrate the host application 340 from one host computer 300 to another host computer with the ability to use fast local VM 500.

Figure 5:
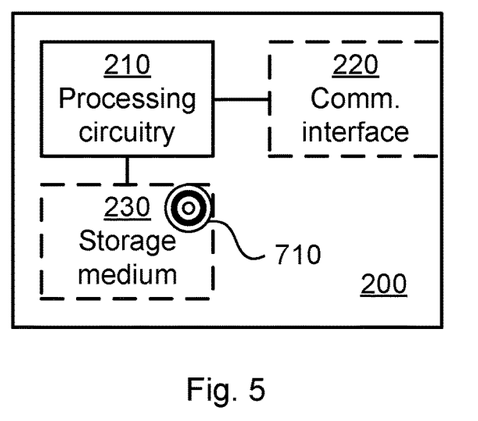
FIG. 5 is a schematic diagram showing functional units of an FPGA according to an embodiment.

FIG. 5 schematically illustrates, in terms of a number of functional units, the components of an FPGA 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 710 (as in FIG. 7), e.g. in the form of a storage medium 230.

Particularly, the processing circuitry 210 is configured to cause the FPGA 200 to perform a set of operations, or steps, as disclosed above. For example, the storage medium 230 may store the set of operations, and the processing circuitry 210 may be configured to retrieve the set of operations from the storage medium 230 to cause the FPGA 200 to perform the set of operations. The set of operations may be provided as a set of executable instructions.

Thus, the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The FPGA 200 may further comprise a communications interface 220 at least configured for communications with the host computer 300 and the NVM 400. As such the communications interface 220 may comprise one or more transmitters and receivers, comprising analogue and digital components. The processing circuitry 210 controls the general operation of the FPGA 200 e.g. by sending data and control signals to the communications interface 220 and the storage medium 230, by receiving data and reports from the communications interface 220, and by retrieving data and instructions from the storage medium 230. Other components, as well as the related functionality, of the FPGA 200 are omitted in order not to obscure the concepts presented herein.

Figure 6:
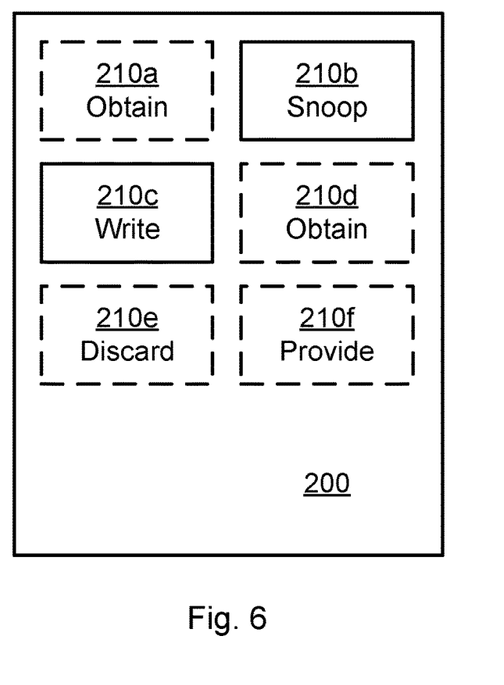
FIG. 6 is a schematic diagram showing functional modules of an FPGA according to an embodiment.

FIG. 6 schematically illustrates, in terms of a number of functional modules, the components of an FPGA 200 according to an embodiment. The FPGA 200 of FIG. 6 comprises a number of functional modules; a snoop module 210b configured to perform step S104 and a write module 210C configured to perform step S106. The FPGA 200 of FIG. 6 may further comprise a number of optional functional modules, such as any of an obtain module 210a configured to perform step S102, an obtain module 210d configured to perform step S108, a discard module 210e configured to perform step S110, and a provide module 210f configured to perform step S112. In general terms, each functional module 210a-210f may in one embodiment be implemented only in hardware and in another embodiment with the help of software, i.e., the latter embodiment having computer program instructions stored on the storage medium 230 which when run on the processing circuitry makes the FPGA 200 perform the corresponding steps mentioned above in conjunction with FIG. 6. It should also be mentioned that even though the modules correspond to parts of a computer program, they do not need to be separate modules therein, but the way in which they are implemented in software is dependent on the programming language used. Preferably, one or more or all functional modules 210a-210f may be implemented by the processing circuitry 210, possibly in cooperation with the communications interface 220 and/or the storage medium 230. The processing circuitry 210 may thus be configured to from the storage medium 230 fetch instructions as provided by a functional module 210a-210f and to execute these instructions, thereby performing any steps as disclosed herein.

Figure 7:
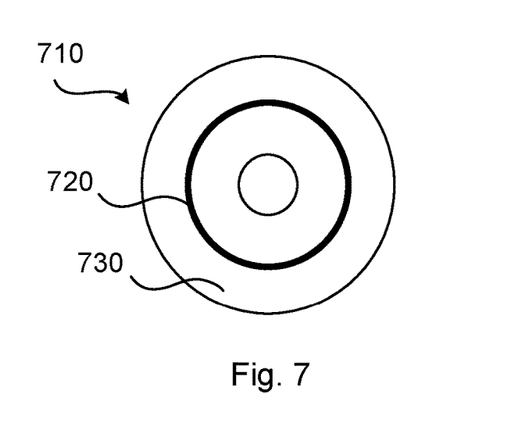
FIG. 7 shows one example of a computer program product comprising computer readable storage medium according to an embodiment.

FIG. 7 shows one example of a computer program product 710 comprising computer readable storage medium 730. On this computer readable storage medium 730, a computer program 720 can be stored, which computer program 720 can cause the processing circuitry 210 and thereto operatively coupled entities and devices, such as the communications interface 220 and the storage medium 230, to execute methods according to embodiments described herein. The computer program 720 and/or computer program product 710 may thus provide means for performing any steps as herein disclosed.

In the example of FIG. 7, the computer program product 710 is illustrated as an optical disc, such as a CD (compact disc) or a DVD (digital versatile disc) or a Blu-Ray disc. The computer program product 710 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 720 is here schematically shown as a track on the depicted optical disk, the computer program 720 can be stored in any way which is suitable for the computer program product 710.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for snapshotting data of a host application, the method being performed by a field-programmable gate array (FPGA), the method comprising:
snooping a cache coherent interconnect of a host computer on which the host application is running, wherein the cache coherent interconnect is snooped for dirty cache lines, each dirty cache line having an address; and
writing, only when an address of a dirty cache line has a match in a snapshot address table, data of the dirty cache line to a non-volatile memory, wherein whether the data is written to a buffer in the FPGA before being written to the non-volatile memory or only the address of the dirty cache line, but not the data itself, is written to the buffer, depends on a size of the buffer, how often data of the dirty cache line is snooped, or depends on both the size of the buffer and how often data of the dirty cache line is snooped.

2. The method according to claim 1, wherein the cache coherent interconnect is snooped via a cache coherent interface of the FPGA, and wherein the cache coherent interface is operatively connected to the cache coherent interconnect.

3. The method according to claim 1, further comprising:
obtaining information of which address space in a volatile memory of the host computer is allocated for storing data of the host application.

4. The method according to claim 3, wherein the volatile memory is a dynamic random access memory (DRAM).

5. The method according to claim 3, wherein entries of the snapshot address table are defined by said address space.

6. The method according to claim 3, wherein the address space is defined by page table entries.

7. The method according to claim 3, wherein said information is obtained from a snapshot library of the host computer.

8. The method according to claim 3, wherein said information is stored in the non-volatile memory.

9. The method according to claim 3, wherein a copy of said information is stored in a local static random access memory (SRAM) in the FPGA.

10. The method according to claim 3, wherein an as large address space as the address space allocated in the volatile memory is allocated in the non-volatile memory for storing the data of the dirty cache lines.

11. The method according to claim 3, further comprising:
obtaining an indicator of data as stored in the non-volatile memory being consistent with data stored in the volatile memory; and
discarding any data having been written to the non-volatile memory after the indicator was obtained in case power of the host computer is lost.

12. The method according to claim 1, further comprising:
providing data as stored in the non-volatile memory to the host computer upon receiving an indication that the host application has recovered its operation after the host computer has recovered from power failure.

13. A field-programmable gate array (FPGA) for snapshotting data of a host application, the FPGA comprising processing circuitry, wherein the processing circuitry to cause the FPGA to:
snoop a cache coherent interconnect of a host computer on which the host application is running, wherein the cache coherent interconnect is snooped for dirty cache lines, each dirty cache line having an address; and
write, only when an address of a dirty cache line has a match in a snapshot address table, data of the dirty cache line to a non-volatile memory, wherein whether the data is written to a buffer in the FPGA before being written to the non-volatile memory or only the address of the dirty cache line, but not the data itself, is written to the buffer, depends on a size of the buffer, how often data of the dirty cache line is snooped, or depends on both the size of the buffer and how often data of the dirty cache line is snooped.

14. A field-programmable gate array (FPGA) for snapshotting data of a host application, the FPGA comprising:
a snoop module configured to snoop a cache coherent interconnect of a host computer on which the host application is running, wherein the cache coherent interconnect is snooped for dirty cache lines, each dirty cache line having an address; and
a write module configured to write, only when an address of a dirty cache line has a match in a snapshot address table, data of the dirty cache line to a non-volatile memory, wherein whether the data is written to a buffer in the FPGA before being written to the non-volatile memory or only the address of the dirty cache line, but not the data itself, is written to the buffer, depends on a size of the buffer, how often data of the dirty cache line is snooped, or depends on both the size of the buffer and how often data of the dirty cache line is snooped.

15. The FPGA according to claim 14, wherein the cache coherent interconnect is snooped via a cache coherent interface of the FPGA, and wherein the cache coherent interface is operatively connected to the cache coherent interconnect.

16. A non-transitory computer readable storage medium comprising computer code which, when run on processing circuitry of a field-programmable gate array (FPGA), causes the FPGA to perform operations for snapshotting data of a host application comprising:

snooping a cache coherent interconnect of a host computer on which the host application is running, wherein the cache coherent interconnect is snooped for dirty cache lines, each dirty cache line having an address; and     writing, only when an address of a dirty cache line has a match in a snapshot address table, data of the dirty cache line to a non-volatile memory, wherein whether the data is written to a buffer in the FPGA before being written to the non-volatile memory or only the address of the dirty cache line, but not the data itself, is written to the buffer, depends on a size of the buffer, how often data of the dirty cache line is snooped, or depends on both the size of the buffer and how often data of the dirty cache line is snooped.

\* \* \* \* \*